(12) United States Patent
Sie et al.

(10) Patent No.: US 7,739,707 B2
(45) Date of Patent: *Jun. 15, 2010

(54) PARENTAL CONTROLS USING VIEW LIMITS

(75) Inventors: John J. Sie, Englewood, CO (US); Gregory R. DePrez, Highlands Ranch, CO (US); John C. Beyler, Highlands Ranch, CO (US); Jean Paul Casaubon, Aurora, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1173 days.

This patent is subject to a terminal disclaimer.

(21) Appl. No.: 10/824,625

(22) Filed: Apr. 13, 2004

(65) Prior Publication Data

US 2004/0221303 A1 Nov. 4, 2004

Related U.S. Application Data

(63) Continuation-in-part of application No. 10/300,723, filed on Nov. 19, 2002.

(60) Provisional application No. 60/331,886, filed on Nov. 20, 2001.

(51) Int. Cl.
*H04N 7/16* (2006.01)

(52) U.S. Cl. .......................................... 725/25; 725/29

(58) Field of Classification Search .............. 725/25–30
See application file for complete search history.

(56) References Cited

U.S. PATENT DOCUMENTS 5,130,792 A 7/1992 Tindell et al.

(Continued)

FOREIGN PATENT DOCUMENTS

WO WO 00/59220 A1 10/2000

(Continued)

OTHER PUBLICATIONS

Ciciora, Walter; James Farmer; David Large; *Modem Cable Television Technology: Video, Voice, and Data Communications*; Morgan Kaufmann Publishers, Inc.; 1999; Chapter 16; pp. 659-688.

*Primary Examiner*—Brian T Pendleton
*Assistant Examiner*—Jean D Saint Cyr
(74) *Attorney, Agent, or Firm*—Townsend and Townsend and Crew, LLP

(57) ABSTRACT

The present invention relates to a system for controlling the viewing of a video program by an end user. In one embodiment, the system comprises a program distribution system adapted to provide programs to one or more end user viewing devices, and a viewing control system in communication with the program distribution system and the end user viewing devices. In one embodiment, the viewing control system comprises a parental control programming system adapted to receive parental control rules from an end user. The parental control rules may define program viewing limits for one or more time periods. The viewing control systems may further comprise a program viewing limit control system that is adapted to count a number of viewings of a program during the one or more time periods, determine whether the number of viewings exceeds the defined program viewing limits for the one or more time periods, and prevent further viewings of the program if the number of viewings exceeds the defined program viewing limits for the one or more time periods.

35 Claims, 9 Drawing Sheets

U.S. PATENT DOCUMENTS

| | | | | |
|---|---|---|---|---|
| 5,191,573 A | | 3/1993 | Hair | |
| 5,331,353 A | * | 7/1994 | Levenson et al. | 725/29 |
| 5,400,402 A | * | 3/1995 | Garfinkle | 380/231 |
| 5,548,345 A | * | 8/1996 | Brian et al. | 725/27 |
| 5,589,892 A | | 12/1996 | Knee et al. | |
| 5,610,653 A | | 3/1997 | Abecassis | |
| 5,619,249 A | | 4/1997 | Billock et al. | |
| 5,684,918 A | | 11/1997 | Abecassis | |
| 5,734,853 A | | 3/1998 | Hendricks et al. | |
| 5,805,154 A | | 9/1998 | Brown | |
| 5,973,683 A | * | 10/1999 | Cragun et al. | 715/719 |
| 5,995,134 A | | 11/1999 | Hayashi | |
| 6,025,868 A | * | 2/2000 | Russo | 725/104 |
| 6,049,333 A | | 4/2000 | LaJoie et al. | |
| 6,057,872 A | | 5/2000 | Candelore | |
| RE36,801 E | | 8/2000 | Logan et al. | |
| 6,144,401 A | * | 11/2000 | Casement et al. | 725/30 |
| 6,163,272 A | | 12/2000 | Goode et al. | |
| 6,166,730 A | | 12/2000 | Goode et al. | |
| 6,209,024 B1 | | 3/2001 | Armstrong et al. | |
| 6,229,895 B1 | | 5/2001 | Son et al. | |
| 6,233,389 B1 | | 5/2001 | Barton et al. | |
| 6,233,607 B1 | | 5/2001 | Taylor et al. | |
| 6,240,553 B1 | | 5/2001 | Son et al. | |
| 6,253,375 B1 | | 6/2001 | Gordon et al. | |
| 6,282,207 B1 | | 8/2001 | Lerman et al. | |
| 6,314,572 B1 | * | 11/2001 | LaRocca et al. | 725/60 |
| 6,314,573 B1 | | 11/2001 | Gordon et al. | |
| 6,314,575 B1 | | 11/2001 | Billock et al. | |
| 6,324,338 B1 | | 11/2001 | Wood et al. | |
| 6,445,398 B1 | | 9/2002 | Gerba et al. | |
| 6,463,585 B1 | | 10/2002 | Hendricks et al. | |
| 6,922,843 B1 | * | 7/2005 | Herrington et al. | 725/30 |
| 2001/0003846 A1 | | 6/2001 | Rowe et al. | |
| 2002/0032905 A1 | | 3/2002 | Sherr et al. | |
| 2002/0077880 A1 | | 6/2002 | Gordon et al. | |
| 2002/0120498 A1 | | 8/2002 | Gordon et al. | |
| 2003/0005447 A1 | * | 1/2003 | Rodriguez | 725/51 |
| 2003/0040962 A1 | | 2/2003 | Lewis | |
| 2003/0124973 A1 | | 7/2003 | Sie et al. | |
| 2003/0126595 A1 | | 7/2003 | Sie et al. | |
| 2003/0204852 A1 | * | 10/2003 | Fenwick et al. | 725/83 |

FOREIGN PATENT DOCUMENTS

| | | |
|---|---|---|
| WO | WO 01/52543 A1 | 6/2001 |
| WO | WO 03/044835 A3 | 5/2003 |

* cited by examiner

PARENTAL CONTROLS USING VIEW LIMITS

CROSS-REFERENCES TO RELATED APPLICATIONS

This application is a continuation-in-part of U.S. patent application Ser. No. 10/300,723 filed on Nov. 19, 2002, and entitled "Viewing Limit Controls," which claims the benefit of U.S. Provisional Patent Application Ser. No. 60/331,886, filed on Nov. 20, 2001, and entitled "Video On Demand Controls," both of which are incorporated by reference herein for all purposes.

BACKGROUND OF THE INVENTION

This invention relates generally to content delivery, and more specifically to delivering viewings of program content to users.

Presently, the traditionally separate telecommunication services, such as phone service, cable service, and data service, are merging together, so that service providers can provide all different types of content through a single medium. For example, service providers are competing to provide end users with content, such as telephone service, video programs, sound recordings, still photographs or pictures, data, etc., through a number of different communication means, such as cable television systems, satellite systems, wireless systems, cellular systems, or Internet connections, which can include the previous listed communication connections, as well as POTS, xDSL, microwave, and any other suitable telecommunication interfaces. Regardless of how the content is delivered to the end user, however, for various different business and sociological reasons, the content provider may want to control access to some of the content, for example, by controlling the number of viewings, downloads or connections to the content.

One area in which controlling access to content is becoming increasingly important is the video programming area. As one skilled in the art will appreciate, the number of times a movie is allowed to be watched in a given time period is controlled by a number of factors, such as studio agreements, royalty rates, and perhaps a subscription level of the user. Thus, it may be desirable to control the number of viewings a user may have to video or movie program content provided through vehicles such as pay per view (PPV), video on demand (VOD), near video on demand (NVOD) and subscription video on demand (SVOD) services.

Similarly, it may be desirable to control the access to online or Internet content, such as music, interactive games, computer programs, etc. Thus, what is needed are systems and methods for controlling access to content regardless of the means or systems used to deliver the content.

BRIEF SUMMARY OF THE INVENTION

The present invention relates generally to a system for controlling the viewing of a program by an end user. In one embodiment, the system comprises a program distribution system adapted to provide programs to one or more end user viewing devices, and a viewing control system in communication with the program distribution system and the end user viewing devices. In one embodiment, the viewing control system comprises a parental control programming system adapted to receive parental control rules from an end user. The parental control rules may define program viewing limits for one or more time periods. The viewing control systems may further comprise a program viewing limit control system that is adapted to count a number of viewings of a program during the one or more time periods, determine whether the number of viewings exceeds the defined program viewing limits for the one or more time periods, and prevent further viewings of the program if the number of viewings exceeds the defined program viewing limits for the one or more time periods.

In one embodiment, the parental control rules define program viewing limits based on one or more criteria, such as the time period, the program content, a combination of time period and program content, or the like. For example, the program viewing limits can be set to zero for adult content, or the program viewing limits can be set high for educational content. Similarly, the program viewing limits can be set low for a time period after school, or for a late night time period.

In one embodiment, the parental control programming system is adapted to receive and implement defined parental control rules for a plurality of end users, and the program viewing limit control system is adapted to apply the defined parental control rules to each of the plurality of end users.

In yet another embodiment, the program distribution system may comprise any program distribution system, such as a cable programming transmission network, a satellite programming transmissions network, an audio or video server connected to the Internet, or the like. Further the viewing control system may comprise any number of different configurations and may be located at number of different locations. For example, the viewing control system may comprise a server located at a program service provider, or the viewing control system may be configured with the program distribution system. Further, the viewing control system may comprise a computing device at an end user location in communication with a server located at a program service provider.

In one embodiment, the computing device may comprise any suitable computing device, such as a set-top box, a personal video recorder (PVR), a video server, a television having set-top box and/or PVR functionality built therein, other devices with an integral set-top box functionality (i.e., plug and play devices), a personal computing device, a personal digital assistant (PDA), a wireless phone, a portable media center, or the like. In addition, the one or more end user viewing devices may comprise any suitable viewing device, such as a television set, a set-top box, a personal video recorder (PVR), a computer, a PDA, a cellular phone, a wireless phone, a portable media center, or any combination of these devices.

In another embodiment, the programs may comprise any number of different types of programs, such as pay per view video on demand (VOD) programs, near VOD programs, subscription VOD programs, cable television programs, satellite television programs, terrestrially broadcast programs, music programs, or the like.

In some embodiments, the viewing control system is adapted to count a number of viewings viewed using all of the one or more end user viewing devices, and prevent further viewings for all of the one or more end user viewing devices if the number of viewings exceeds the viewing limit for the time period. In other embodiments, the viewing control system is adapted to count a number of viewings viewed by each of the one or more end user viewing devices separately, and prevent further viewings for each of the one or more end user viewing devices separately if the number of viewings for the one or more viewing devices exceeds the viewing limit for the time period.

In yet other embodiments, the present invention comprises a method for controlling the viewing of programs by an end user. In accordance with these embodiments, the method comprises: receiving parental control rules from an end user, the parental control rules defining program viewing limits for one or more time periods; counting a number of viewings of a program during the one or more time periods; determining whether the number of viewings exceeds the defined program viewing limits for the one or more time periods; and preventing further viewings of the program if the number of viewings exceeds the defined program viewing limits for the one or more time periods.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Viewing Limit Controls

Figure 1A:
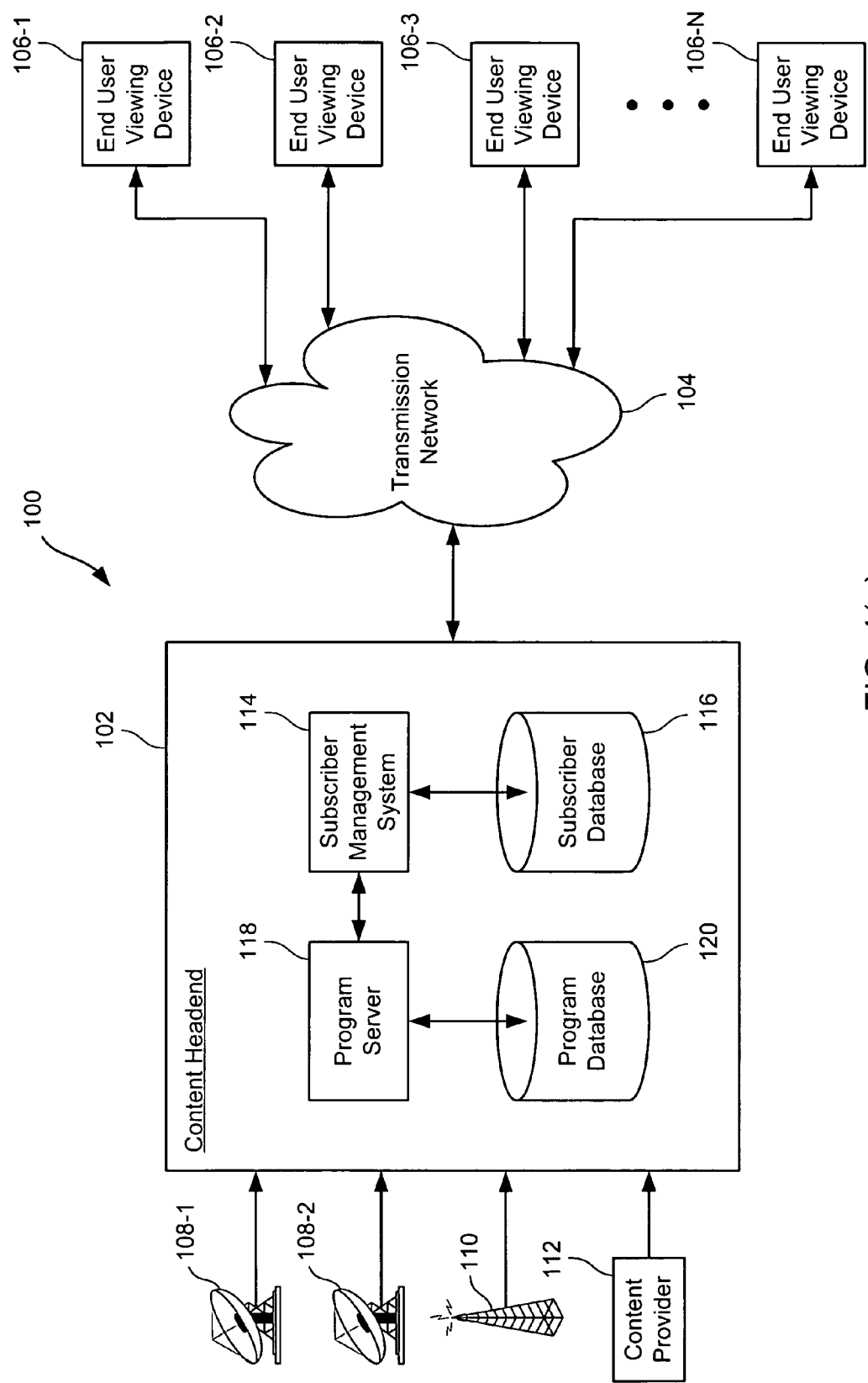
FIG. 1(a) is a block diagram a system in accordance with one embodiment the present invention.

The present invention provides systems and methods for controlling the viewing of and/or access to program content.

As used herein, the terms programs and program content refer to any content that can be provided to end users via telecommunication networks and connections, and for which it is desirable to limit end user viewings or access of such content. For example, programs can be video programs and/or music programs. Further, the programs can be delivered to end users using any number of different business and delivery models such as, for example, pay per view video programming or subscription programming delivered via satellite or on demand using any suitable communication network. Some embodiments may limit the term content to video content.

Regardless of the types of programs being provided or the business model being implemented, the present invention can be configured to limit the number of programs and/or the number of viewings of each of the programs to which end users may have access for a given time period. As discussed above, the viewing limit controls of the present invention can be implemented for any suitable content and/or programs and with any suitable communication network configuration. For ease of description, however, this specification will use examples of video programming, such as pay per view VOD, near VOD (NVOD), and subscription VOD (SVOD) to illustrate exemplary embodiments of the present invention. One skilled in the art should recognize, however, that the present invention is not limited to video programming or the embodiments set forth in this specification.

Throughout the rest of this document, unless specified otherwise, the term VOD shall refer collectively to pay per view VOD, NVOD and SVOD. As one skilled in the art will appreciate, VOD is a service in which one or a number of video programs are made available to subscribers during a time period. For example, video programs may be provided to users on-demand on a pay per view basis, or each month a new lineup of a predetermined number of programs (e.g., 10) may be made available to subscribers who pay a monthly subscription fee (e.g., $5 per month). In accordance with some embodiments of the invention, viewing limits can be defined for the viewing of those programs. For example, a predetermined viewing limit can be defined for one or all of the programs during a specified time period.

In one embodiment of the present invention, the viewing limit may be a value between one and infinity for a particular time period. Other embodiments could limit the value between zero and ninety-nine. For example, a first program may have a limit of five, a second program has a limit of one, and a third program has no limit. In one embodiment, the viewing limit is for a group of programs, for example, any ten movies could be viewed in a particular month.

In accordance with other embodiments of the invention, the viewing limit may be different for different time periods. For example, a given program may have a first viewing limit for a first time period that is different from a second viewing limit for a second time period. In some embodiments, those time periods could be back-to-back. For example a first time period has a view limit of ten and the next time period has a limit of twenty.

The time period could be different in various embodiments. In some embodiments, the time period could be years, portions of years (e.g., half-years or quarter), months, weeks or days. In other embodiments, the time period is tied to portions of the day, such as morning, afternoon, evening, late evening, night, prime time viewing, etc. In other embodiments, the time period could be combinations of the above. For example, the viewing limit for a particular program might be one viewing of the program during the prime time period in a month, and the viewing limit for the same program might be five viewings of the program during non-prime time periods in a month.

As one skilled in the art will appreciate, the viewing limit can be any number of viewings in any particular time period or combination of time periods. In addition, the viewing limits may be different for different types of programs. For example, newer or more popular movies may have lower viewing limits than older or less popular ones. In other embodiments, the viewing limits can be set for a single program or for groups of programs. For example, in a SVOD service, a user may have access to a number of different programs in a given time period (e.g., 20 programs). In one embodiment, viewing limits may be set for each program individually, or the service provider may apply a cumulative viewing limit to all the programs together as a whole. Thus, the programs in a group could be viewed a set number of times without regard to the program being played. For example, a cumulative viewing limit for a group of twenty programs could be defined as ten. In one time period, the first program could be viewed ten times and the others none. In another time period, the first and second programs could be viewed five times each to reach the cumulative viewing limit. Any combination of programs viewed in the group is possible so long as the cumulative viewing limit is not exceeded in the time period.

In some embodiments, the viewing limits can change when the program lineup changes, or the viewing limits can change when time periods change, such as, for example, monthly, weekly, daily or hourly, depending on what the time period is.

In accordance with one embodiment of the present invention, a viewing may be counted toward the viewing limit as soon as a user initiates a viewing of a program. In other embodiments, a viewing may not be counted until after a predetermined period of viewing time has elapsed or until a minimum portion of the program is viewed (e.g., more than 5 minutes of continuous viewing triggers a view count). For example, a service provider may allow a user to preview a program prior to counting an official viewing. The preview can be a clip of a program defined by the service provider, or the preview can be some other clip of a program, such as a predetermined length of the program at some point in the program, for example. In another embodiment, a free viewing period may be available. During that period, programs can be viewed any number of times. The free viewing period may or may not be limited to subscribers of the service that include the programs.

In one embodiment, a view is defined by any amount of viewing in a period. Once a first view begins, any number of subsequent views can occur within a time period without counting as further views. For example, if a first view is initiated, any viewing is unlimited for a one-day time period measured from the first view.

Some embodiments could limit the views available to be equal the number of times the program is available in some other delivery format. The number of times a program appears in the linear schedule for a given time period could be used to set the limit count for viewing with SVOD delivery. For example, if the program were available four times in the month from the linear schedule, the SVOD limit for that same month could be set to four. In one embodiment, views in a number of delivery formats count toward the limit. For example, the limit could be three and the user watches twice in the linear schedule and once with SVOD delivery to reach the limit.

When a viewing limit is reached, any one or more of a number of business functions may occur. For example, in one embodiment, when a user reaches the viewing limit, a service provider could charge an additional per use fee for viewing past the viewing limit in a given time period. In some embodiments, the viewing limit can be reset if the program is available again in the next defined time period.

In other embodiments of the present invention, messages may be presented to the user stating that a viewing limit has been reached, or a programming guide may be changed to reflect the viewing limit. For example, when a program's view limit is reached, the program may be explicitly removed from the lineup displayed in a menu or electronic program guide (EPG). The menu or EPG shows the programs available for viewing in the VOD modes. Once a program has reached its viewing limit for the time period, the menu or EPG can reflect that it is unavailable or can remove it from being displayed as an option to the user altogether.

In accordance with other embodiments, icons can be present on the viewing screen showing the number of viewings available to the user, or icons can be displayed on the menu or EPG. For example, icons could be shown in a channel versus time programming grid type EPG. These icons could disappear when the viewing limit is reached. Where the user is given no indication that a program is unavailable, but that user has reached the viewing limit, and the user attempts to select the program, a message may be displayed informing the user of the status or asking for authorization to further charge the user for extending the viewing limit. For a more detailed discussion of customization of electronic programming guides, see U.S. patent application Ser. No. 10/128,653 filed on Apr. 22, 2002, and entitled "Program Guide Environment," the entirety of which is incorporated by reference herein for all purposes.

As one skilled in the art will appreciate, any suitable messaging or notification system could be used to notify the user of the number of viewings left, or that the viewing limit has been reached. For example, instead of using messages or icons, different colors or shading could be used to show that a viewing limit has been reached. Thus, the present invention should not be limited to the embodiments disclosed herein.

System Configurations

In some embodiments of the present invention, a subscriber management system and/or viewing limit control system may be configured to provide the viewing limited programs, as defined above, to end users through a suitable communication network or connection. In some embodiments, the subscriber management system and the viewing limit control system may be separate systems. In other embodiments, the subscriber management system is configured to operate as the viewing limit control system. As one skilled in the art will appreciate, management control systems easily can be configured as a single system or multiple separate systems. Thus, in this specification, the terms subscriber management system and viewing limit control system may be used interchangeably to refer to systems for implementing the viewing limit control functions and methods set forth herein.

The communication network or connection may comprise any communication network or connection currently known in the art or hereinafter developed. Examples of currently know communication networks include cable television networks, satellite television networks, xDSL networks, wireless networks, cellular networks, and Internet connections, such as dial-up POTS Internet connections, xDSL Internet connections, microwave Internet connections, cellular Internet connections, satellite Internet connections, and the like.

Figure 1B:
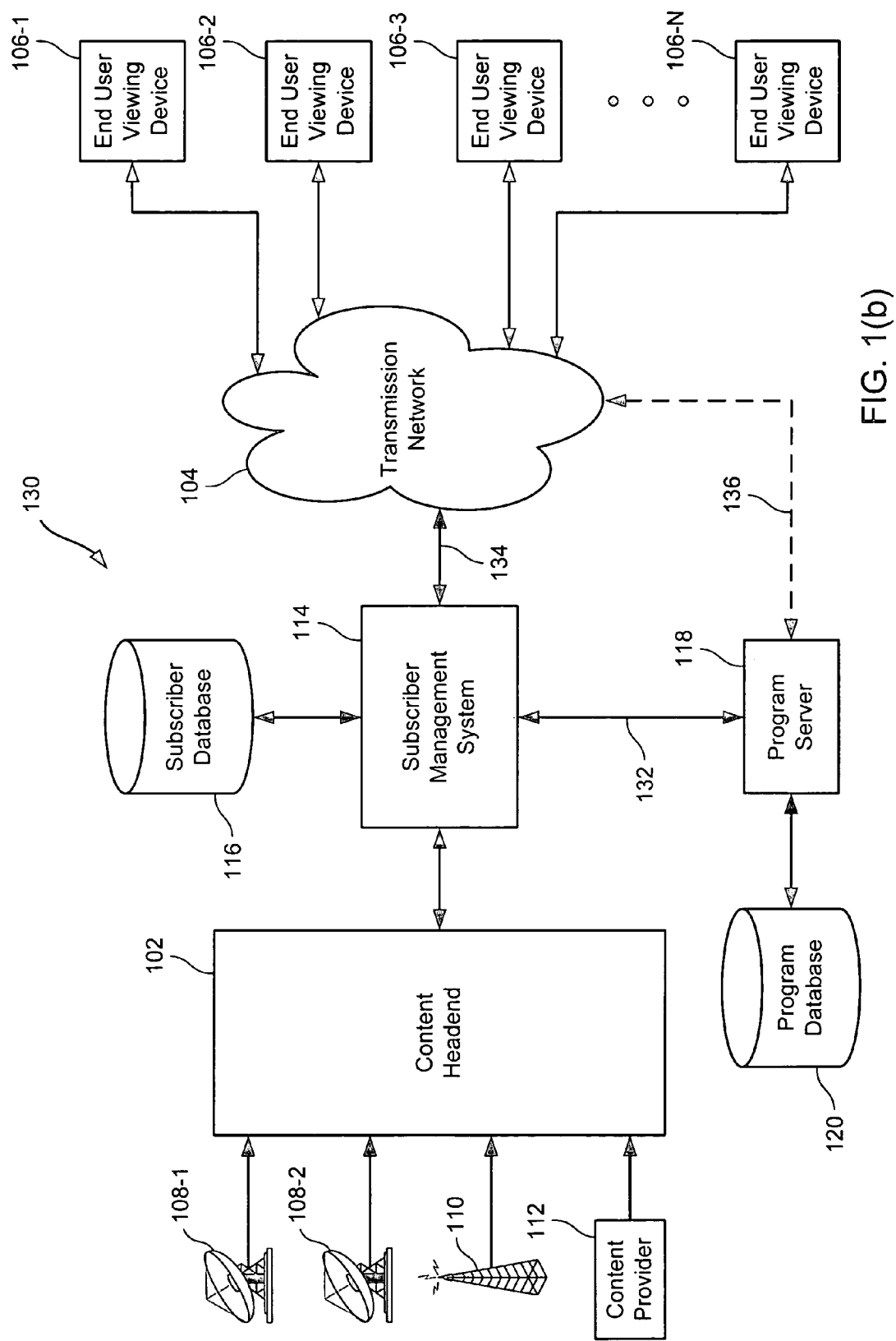
FIG. 1(b) is a block diagram showing a system in accordance with another embodiment of the present invention.
Figure 1C:
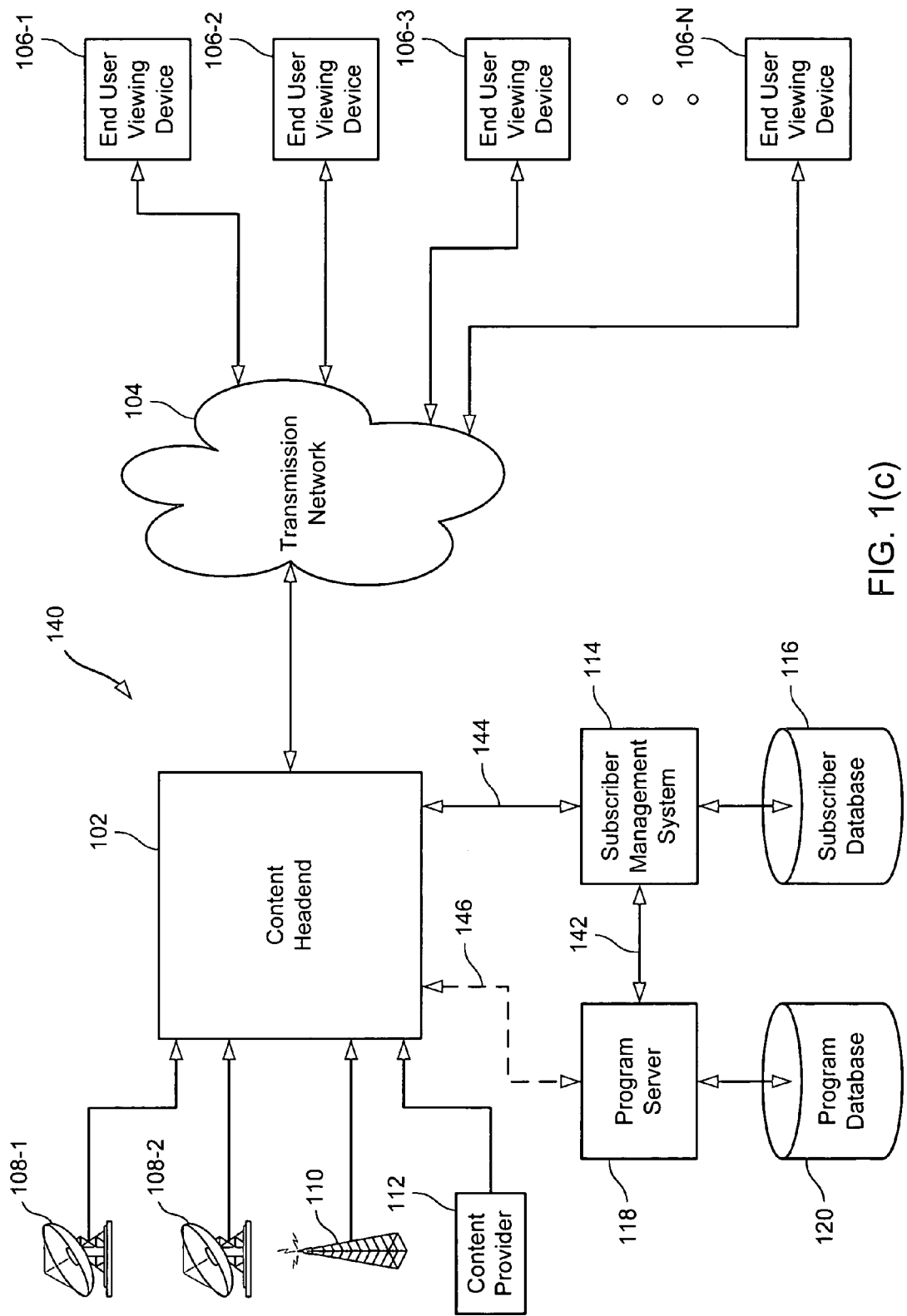
FIG. 1(c) is a block diagram of a system in accordance with yet another embodiment of the present invention.

FIGS. 1(a)-1(d) illustrate various different ways of configuring communication networks and subscriber management systems to implement the present invention. One skilled in the art will appreciate, however, that the embodiments illustrated in FIGS. 1(a)-1(c) are merely exemplary embodiments, and that other networks and system configuration may be used without departing from the spirit of the present invention. Thus, the present invention should not be limited to the illustrated embodiments.

Referring now to FIG. 1(a), one embodiment of a system 100 for implementing viewing limit controls in accordance with the present invention is shown. In the illustrated embodiment, system 100 comprises a content or program headend 102, a transmission network 104, and end user viewing devices 106. In one embodiment, headend 102 may be, for example, a cable, wireless, cellular phone, Internet or satellite headend for providing video, music and Internet/data content to end users. In this embodiment, the headend 102 is a multi-channel video distribution system where viewers can choose from a linear schedule of programs on the various channels.

As one skilled in the art will appreciate, a cable or satellite headend generally receives video and music programming from third-party sources, formats the programming, modulates the programming onto different channels, and delivers the programming to the end users through its associated transmission systems, such as cable, satellite, xDSL, or the like. In accordance with this aspect of the present invention, headend 102 may receive programming information from various third-parties, for example, via satellite receivers 108, broadcast antenna 110, or via a direct connection from a third party 112.

Transmission network 104 may comprise any suitable communication network currently known or hereinafter developed. In one embodiment, the transmission network is a cable distribution network currently known in the art. Other embodiments may include xDSL networks, satellite distribution networks, IP protocol networks, such as the Internet, a microwave or wireless communication network, or the like.

End user viewing devices 106 may comprise any suitable device for receiving and viewing content. For example, end user devices 106 may comprise a television set, a set-top box, a personal video recorder (PVR), a television set having set-top box and/or PVR functionality built in, any type of computing device such as a PC or a personal digital assistant (PDA), a cellular or wireless telephone, a portable display device, a traveling car theatre, a portable media center, a portable digital video recorder (DVR), video goggles, an IP telephone, or the like.

The end user viewing device 106 may implement the parental control and viewing limits. In some embodiments, the headend 102 may also take a role in this process or exclusively control the process. In one embodiment, the limits are sent the viewing device 106, which enforces those limits. In some cases, the viewing device 106 may be able to authorize some viewing without immediately confirming authorization with the headend. At some later time, the authorization could be reported and confirmed, for example, by a daily telephone call. A preset threshold could be used where any charges under that threshold could wait for the periodic contact with the headend 102. The parental controls could be entered in the local viewing device 106 and reported immediately to the headend 102 or according to some periodic schedule. In some embodiments, only the viewing device 106 stores the locally entered parental control information. Some embodiments could have web interface to modify the parental controls and manage viewing limits with a computer or other web browsing device.

In accordance with one embodiment of the present invention, headend 102 further includes a subscriber management system 114 for managing subscribers of the services provided by the headend system. For example, subscriber management system 114 determines to which programs and services a subscriber or user has access, such as local channel access or premium channel access. In addition, subscriber management system 114 can be configured to manage the provisioning of pay services, such as pay-per-view programming, VOD programming, and the like. In the illustrated embodiment, subscriber management system 114 comprises or is connected to a subscriber database 116, which stores subscriber specific data, such as subscriber name, address, billing information, etc. Subscriber database 116 also may store the types of services the subscriber or user has access to, such as pay channels or the like.

In one embodiment, the subscriber management system 114 also may be used to provision the VOD services. In accordance with this aspect of the invention, subscriber management system 114 is in communication with a program server 118, which comprises a program database 120. When a subscriber or user orders VOD services, subscriber management system 114 validates the order and handles the billing procedures for the provisioned service. If the user is valid and meets the conditions for receiving the service, subscriber management system 114 in conjunction with program server 118 will provide the service or program to the user.

In one embodiment, the subscriber management system 114 tracks viewing habits of the various users, while addressing privacy issues. Any time a view is performed or parental control is used, this can be reported to the subscriber management system 114. The tracking includes what parental controls are programmed into the viewing device 106, which parts of a program are viewed, how many times a program is viewed, where trick-play was activated while viewing, etc. By storing this in the subscriber management system 114 this information can be used in various embodiments to determine advertiser fees, popularity of content, a content deemed inappropriate enough for parental control, etc.

In one embodiment, program server 118 and program database 120 are configured to provide the VOD services to the end user viewing device 106 via transmission network 104. A more detailed discussion on how VOD services may be provisioned is set forth in U.S. patent application Ser. No. 09/687,149 filed on Oct. 12, 2000 and entitled "Programming Distribution System," the entirety of which is incorporated by reference herein for all purposes.

In the illustrated embodiment subscriber management system 114 and program server 118 are configured as part of headend 102. In this embodiment, the VOD programs can be modulated onto a particular channel at the headend and delivered to the end user devices via the network.

In accordance with one embodiment of the present invention, subscriber management system 114 may be configured to implement the viewing limit controls set forth herein. For example, subscriber database 116 can store the viewing limit and the current number of viewings for each user for each time period. When a use views a program during a time period, the subscriber management system will increment the current number of viewings by one or some other appropriate interval for the user. When the user's current number of viewings reaches the viewing limit, subscriber management system 114 can be configured to send a message to the user as discussed above. Also, if the system is configured to add or remove an icon or counter on a program menu, or change the color or shading of the menu when the viewing limit is reached, subscriber management system 114 can be configured to perform these functions. Alternatively, subscriber management system 114 can communicate with headend 102 or some other system which creates and modifies the user interface menu, and then the headend or other system would be responsible for changing the presentation of the menu when a viewing limit is reached.

While one embodiment of the present invention is disclosed herein as having viewing limit controls function performed by or a part of subscriber management system 114, other embodiments of the invention could have a viewing limit control systems separate from subscriber management system 114. Thus, the present invention is not limited to the illustrated embodiments.

In the embodiment illustrated in FIG. 1(a), subscriber management system 114 and program server 118 are configured as part of headend 104. In an alternative embodiment, subscriber management system 114 and program server 118 can be separate from headend 104, for example as illustrated in FIGS. 1(b) and 1(c). FIG. 1(b) illustrates a system 130 in which subscriber management system 114 is positioned between headend 102 and transmission network 104. In this particular embodiment, content passes from headend 102 to subscriber management system 114. Subscriber management system 114 determines which content a user has authorization to access, and then passes that content on to end user devices 106 via transmission network 104.

As discussed above, subscriber management system 114 can be configured in communication with program server 118 and program database 120, and together can provide VOD and other qualified access services to the end users. In the illustrated embodiment shown in FIG. 1(b), the programs from program server 118 can be distributed to transmission network 104 through subscriber management system 114, for example, via communication connections 132 and 134, or the programs can be sent directly from programmer server 118 to transmission network 104, for example via communication connection 136. Regardless of how programs are distributed to the end users, subscriber management system 114 can be configured to implement the viewing limit control functionality as discusses above.

As illustrated in FIG. 1(c), in an alternative embodiment, subscriber management system 114 may be outside of headend 102, for example, if a separate service provider provides the VOD services to end users through the headend system. In this embodiment, the program services are provided by subscriber management system 114 and program server 118 to headend 102. Headend 102 receives the program content, modulates it onto a particular channel and delivers it to end user devices 106 via transmission network 104. As discussed above, subscriber management system 114 (or other suitable viewing limit control system) is configured to process the viewing limit functionality. As shown in FIG. 1(c), program server 118 can transmit the program content to headend 102 through subscriber management system 114, for example, via connections 142 and 144, or program server 118 can transmit the program content to headend 102 directly, for example via connection 146.

Figure 1D:
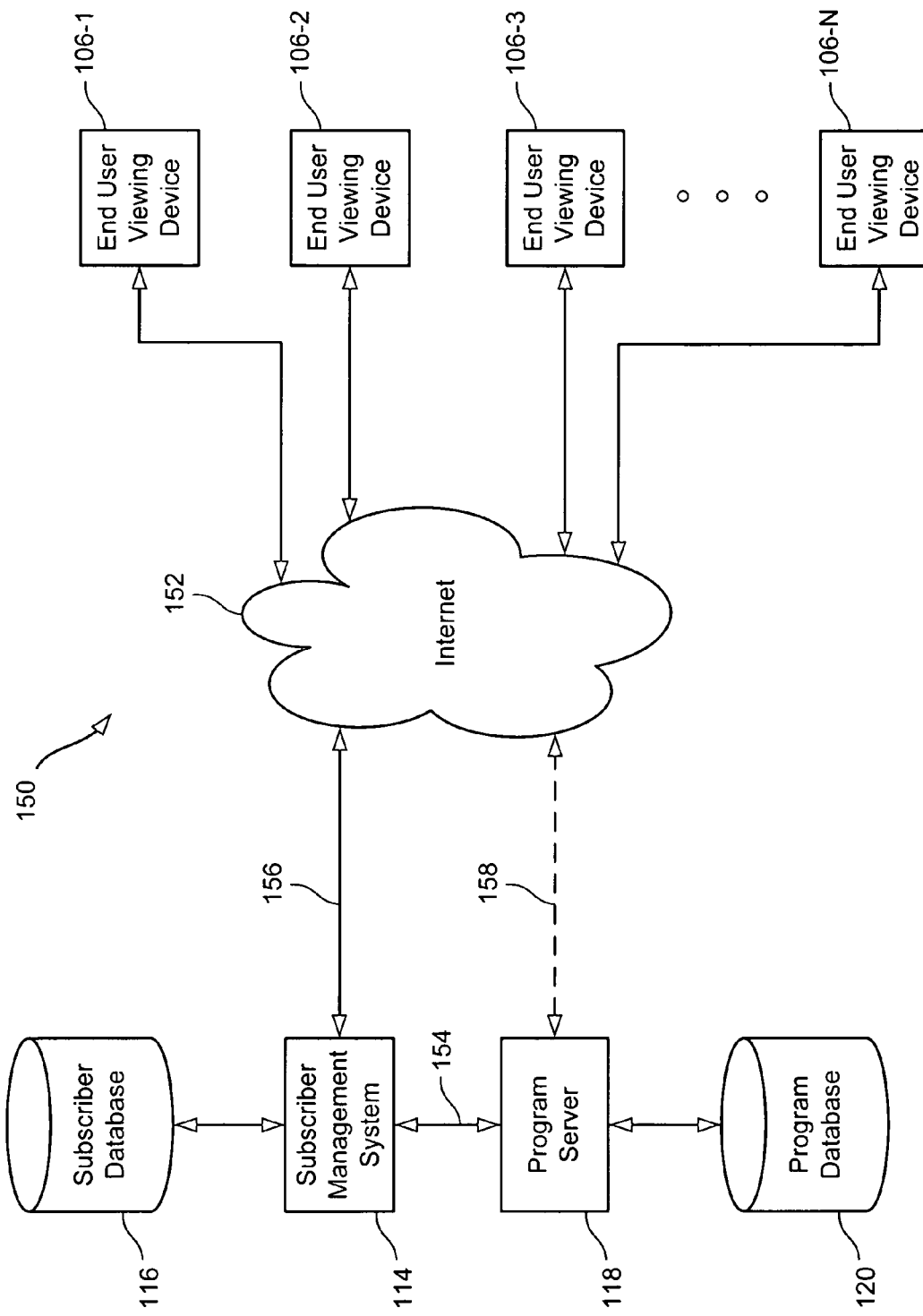
FIG. 1(d) is a block diagram of a system in accordance with yet another embodiment of the present invention.

Referring now to FIG. 1(d), another exemplary embodiment of the present invention is shown. This particular embodiment comprises a system 150, in which a subscriber management system 114 (or other suitable content delivery system) transmits program content directly to end user devices 106 via a communication network, such as the Internet 152. As discussed above, the program content can be any content delivered via the Internet (e.g., video programs, music programs, etc.), and end user devices 106 can be any viewing, listening or computing device which can receive and play the programs. As illustrated in FIG. 1(d), the programming content can be transmitted to Internet 152 from subscriber management system 114, for example, via connection 156, or the content can be transmitted to Internet 152 from some other content or program server 118, for example, via communication connection 158. In either case, subscriber management system 114 is configured to process the viewing limit control functionality.

In other embodiments of the invention, instead of the subscriber management system or viewing limit control system performing all the viewing limit control functionality, additional devices, such as devices 106, at the user location also can be used to implement some or all of the functionality. For example, a set-top box or PVR, or other viewing device such as a PC, PDA, or the like could be configured to track the program viewings and implement the viewing limit control features. In some embodiments, the end user device could store the programs local to the user location and then track the viewings at the user location. In accordance with this embodiment, when a viewing limit is reached, the end user device could be configured to limit any further viewings or provide a message to the end user, as discussed above.

In some embodiments, each time a program is viewed, the end user device may record the particulars of that viewing. For example, a partial viewing may be noted as such so that the viewing limit is reduced by a fraction for the partial viewing. The usage information may be stored for a period of time, and then can be analyzed and reported out. This usage information may be available to the billing system or the subscriber management system to properly charge the user.

In other embodiments, a subscriber management system in conjunction with the end user device may implement the viewing limit control features. For example, the end user device may count the viewings of programs and then send the viewing details to the subscriber management system so the subscriber database can be updated. Also, the end user device may be configured to report to the subscriber management system when a viewing limit is reached, and the subscriber management system then may send a message to the end user or update the viewing menu, as discussed above. In any event, one skilled in the art should appreciate that the viewing limit controls of the present invention can be implemented in any number of different ways, and thus, is not limited to the embodiments disclosed herein.

Applications of Viewing Limit Controls
  Viewing Limits Generally

Figure 2:
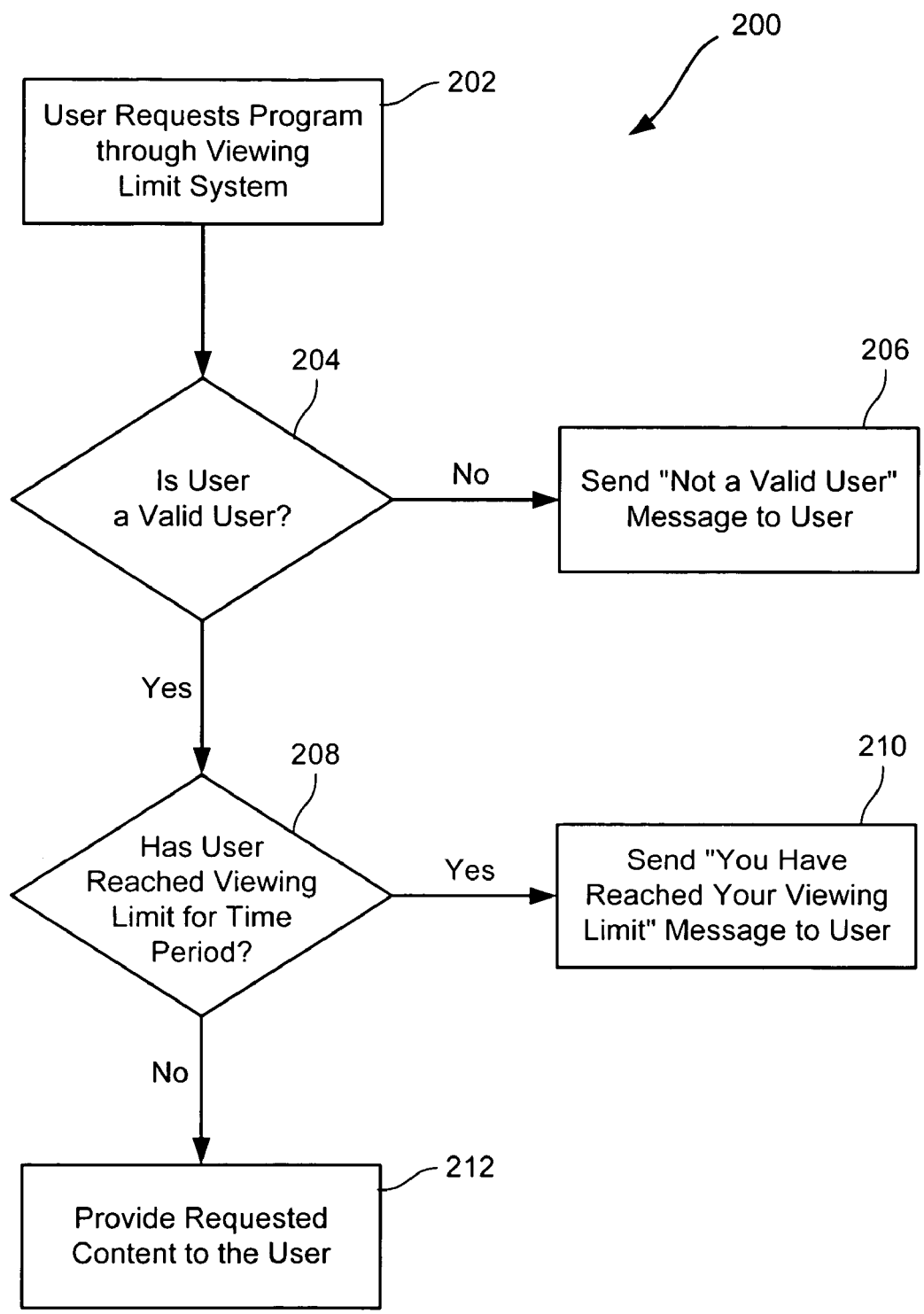
FIG. 2 is a flow chart showing a method for implementing viewing limit controls in accordance with one embodiment of the present invention.

Referring now to FIG. 2, a flow chart 200 illustrating a method for implementing viewing limit controls is shown. In accordance with the illustrated embodiment, a user requests to receive a program, for example, using an end user viewing device 106 as discussed above (block 202). In one embodiment, the request for content goes to a viewing subscriber management system 114 or other suitable viewing limit control system ("the System"), as discussed above (block 202). Upon receiving the program request, the System will check to determine is the user is a valid for the requested program (decision block 204). For example, in the VOD example, the System will determine if the user is a VOD subscriber. As one skilled in the art will appreciate, other user checks also may be implemented.

If the user is not a valid user, the System sends a message to that fact (block 206). If the user is a valid user, the System then determines if the viewing limit for the requested program for the time period has been reached (decision block 208). If the viewing limit has been reached for the time period, the System will send a message to the end user informing him that the view limit was reached (block 210). As discussed above, the system can use other indicators as well, such as altering the electronic programming guide or showing the viewing limit number on a screen.

If the viewing limit has not been reached for the requested program for the time period, the System will provide the end user with the program (block 212). In addition, the System will decrement the viewing limit number and can change the EPG or display to show the new viewing limit number.

Viewing Limit Portability

Viewing limits can be applied in different ways. In some embodiments, the viewing limit may apply to a particular end user device. In other embodiments, the viewing limit may apply to a number of end user devices associated with a user location. In still other embodiments, the viewing limit may be associated with a user such that it follows that user to any end user device in any location. For example, a user name and password entered into another's end user device, such as a set top box, could identify the user when visiting a friend. In some embodiments, the viewing limits could be tied to programming tiers, in which different programming tiers could be entitled to different viewing limits.

Figure 3A:
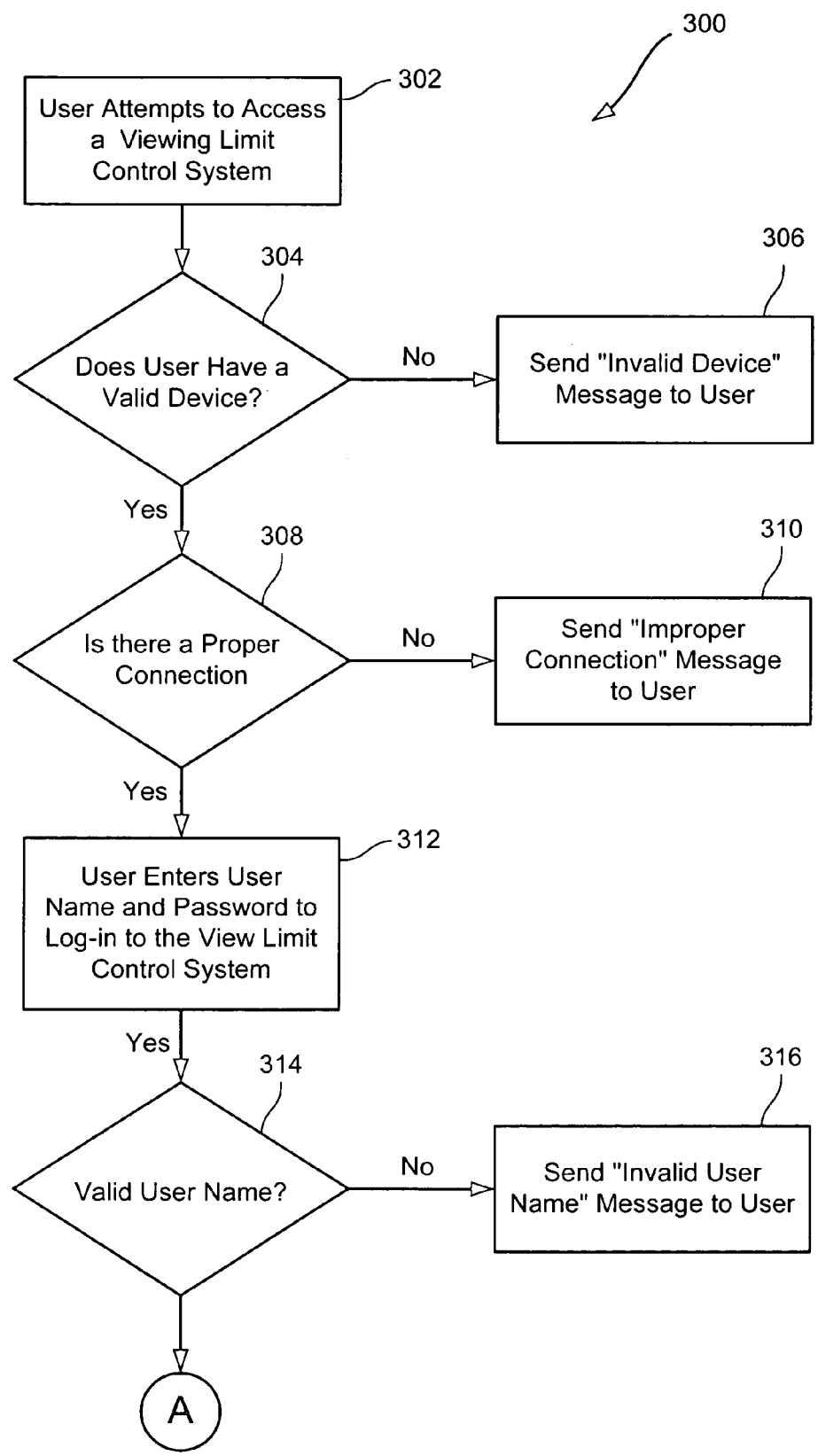
FIGS. 3(a) and 3(b) are flow charts showing a method for implementing the portability of viewing limit controls in accordance with one embodiment of the present invention.
Figure 3B:
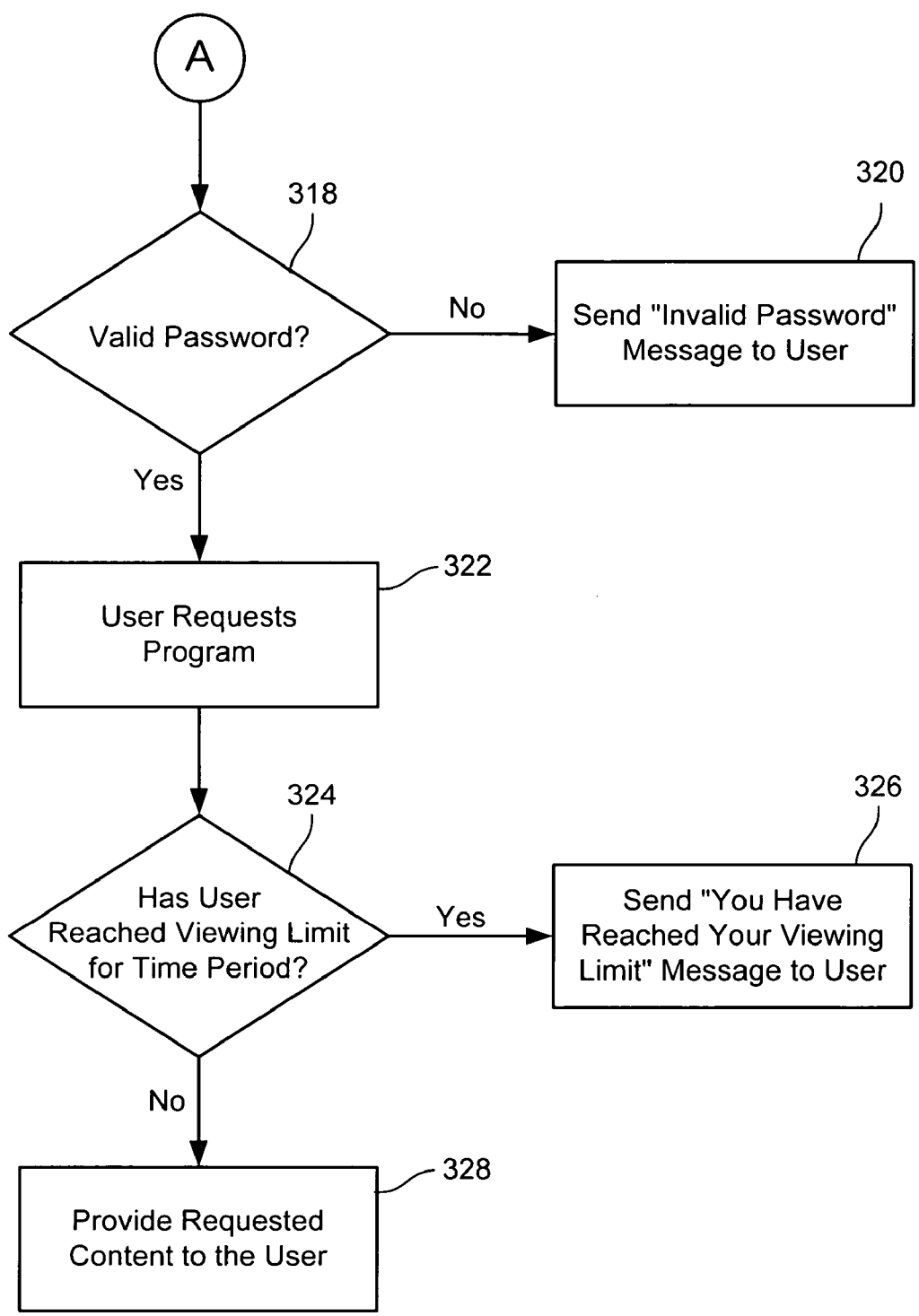

Referring now to flowchart 300 in FIGS. 3(*a*) and 3(*b*), a method for implementing the portability of viewing limit controls will be described. First, a user attempts to access a viewing limit control system at any location using any end user device (block 302). For example, a user may attempt to access the viewing limit control system via the Internet using a computing device, such as a personal computer, a PDA, or the like. Alternatively, the user may attempt to access a video program, such as a VOD program, through a set top box or other video interface.

After the user attempts to access the viewing limit control system, the System checks to determine if the end user device is a valid device to access the program (decision block 304). For example, if the user is attempting to access a movie or other video program, the System will determine if the end user device is appropriate to view a movie. Similarly, the System may check the connection type to ensure that it has enough bandwidth to deliver the program efficiently (decision block 308). If the equipment and/or connection are not adequate for the requested program, the System will send a message to the user to that fact (blocks 306 and 310). Otherwise, the user will attempt to access the System by entering a user name and password or other login information (block 312). The System will authenticate the user by verifying the user name and password (decision blocks 314 and 318). If either the user name or password is invalid, the System will send a message to the end user stating such (blocks 316 and 320).

After the user successfully has logged-in to the System, the user will request the program that he wants (block 322). The system receives the request and checks to determine whether the user has reached the viewing limit for the requested program for the particular time period (decision block 324). If the viewing limit has been reached for the time period, the System will send a message to the end user informing him that the view limit was reached (block 326). As discussed above, the system can use other indicators as well, such as altering the electronic programming guide or showing the viewing limit number on a screen.

If the viewing limit has not been reached for the requested program for the time period, the System will provide the end user with the program (block 328). In addition, the System will decrement the viewing limit number and can change the EPG or display to show the new viewing limit number.

As one skilled in the art will appreciate, there are a number of different ways for the user to access the System and for the System to validate the user. For example, in some embodiments, it may be possible for the System to determine user information automatically, without the user having to enter in the information each time. For a more detailed discussion on different methods of implementing user access and authentication to such systems see U.S. patent application Ser. No. 10/128,654 entitled "Program Guide Enhancements" and U.S. patent application Ser. No. 10/131,507 entitled "Customization in a Content Distribution System," both of which were filed on Apr. 22, 2002, and both of which are incorporated by reference herein for all purposes.

Viewing Limit Parental Controls

In some embodiments, viewing limit controls in accordance with the present invention can be used to implement parental controls. As discussed above, viewing limits can be set for various different time periods and for different content. Thus, based on these parameters, parents can restrict access to different types of content during certain time periods using viewing limits. For example, if a parent wants to restrict access to adult content, the parent can set the viewing limit to zero. Similarly, the parent can set high viewing limits for educational or other acceptable content.

Also, the parent may want to limit access to programs during certain time periods. For example, a parent may want set the viewing limit to zero for a time period immediately after school, essentially reserving that time for homework. Similarly, the parent may want to restrict access to late night programming by setting the viewing limit to zero for that time period. As one skilled in the art will appreciate, any combination of time period and content restrictions may be implemented using viewing limits.

Figure 4:
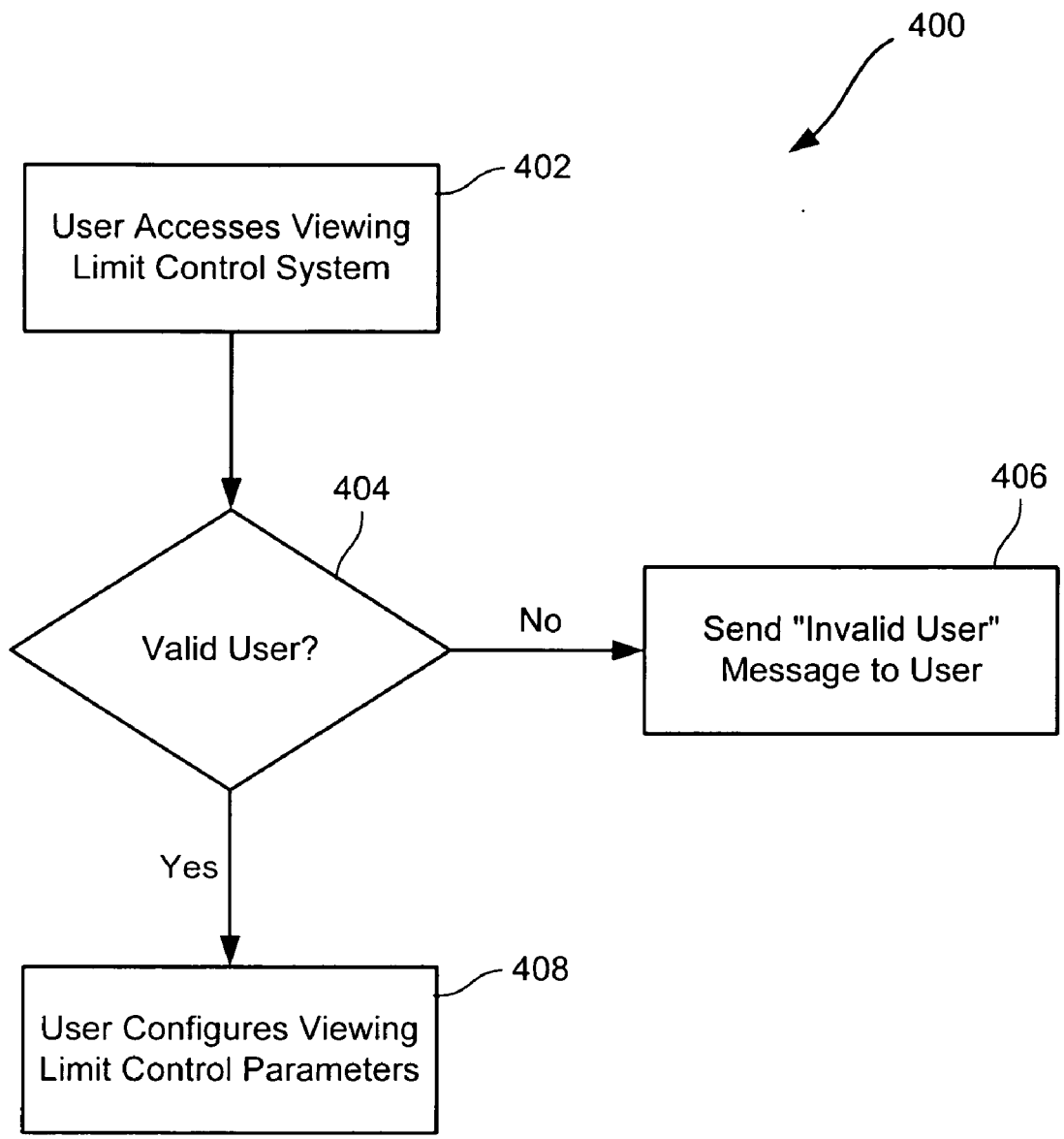
FIG. 4 is a flow chart showing a method for using viewing limit controls to implement parental control of content in accordance with one embodiment of the present invention.

Referring now flow chart 400 in FIG. 4, a method of implementing parental controls using viewing limits will be described. In the illustrated embodiment, a user, for example, parent, will login to the viewing limit control system (block 402), and the system will validate the user (decision block 404). If the user is invalid, the System will send a message, denying access to the System (block 406). Otherwise, the user is given access to a viewing limit configuration menu (block 408). Using the configuration menu, the user can set-up time period and content limits for users and sub-users (e.g., other family members or the like).

In some embodiments, the controls can be for one or more specific end user devices or for a group of devices. Also, the viewing limit controls can be defined for a group of users or separately for individual users and sub-users. For example, a parent could implement different viewing limit controls for each of his children. In this embodiment, the System would need to know which child was accessing the System, for example, by requiring the child to login to the system as discussed above. As one skilled in the art will appreciate, any number of different parental controls can be implemented using the viewing limits of the present invention.

Marketing Messages and Promotions using Viewing Limits

In some embodiments, the viewing limit control system can be configured to provide marketing and promotional messages to end users. For example, if a user reaches his viewing limit, the viewing limit control system can send a message to the user, and then offer the user the opportunity to qualify for or obtain additional viewings. In other embodiments, if the user is a member of a VOD service, upon reaching a viewing limit for a particular subscription level, the System can offer the subscriber/user the opportunity to upgrade his subscription level to higher or different subscription level.

In yet other embodiments, the System can be configured to provide different marketing messages to end users when viewing limits are reached. For example, when a user reaches a certain viewing limit, one message can be delivered, and when the user reaches a different viewing limit, a different message can be sent. In addition, in some embodiments, the viewing limit system can be used to cross-market other products or services. For example, a user can earn points or awards from other companies (e.g., flight miles or the like) after viewing a predetermined number of programs. Similarly, other companies can provide incentives by offering program viewings when certain purchasing levels or other marketing benchmarks are met.

In still other embodiments, viewing incentives can be provided. For example, after a user selects or watches a predetermined number of viewings, the System can grant the user additional viewings. For example, after ten viewings the user may be granted a free viewing. In still another embodiment, a free viewing period may be available. During that period, programs can be viewed any number of times. The free viewing period may or may not be limited to subscribers.

Figure 5:
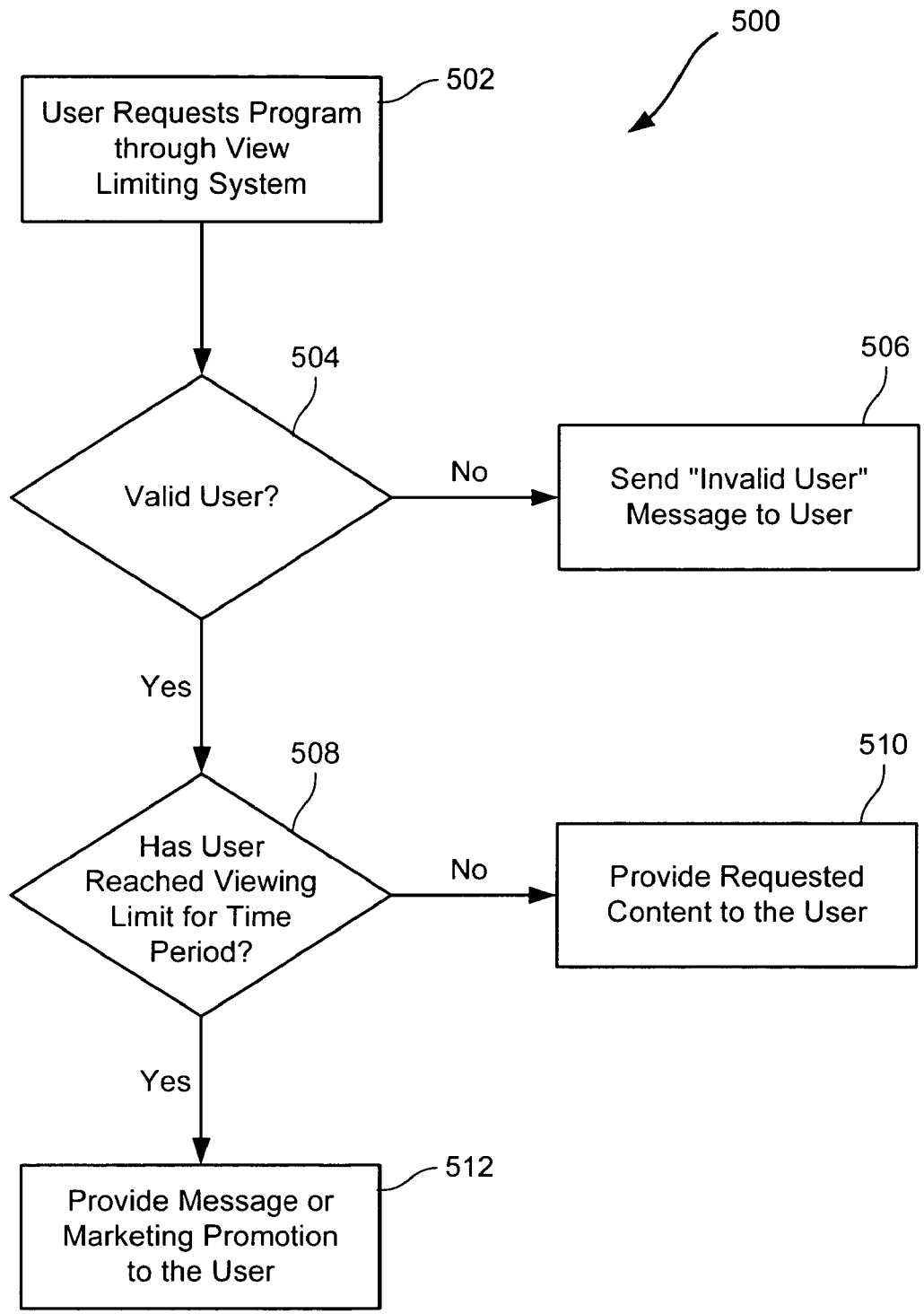
FIG. 5 is a flow chart showing a method for providing marketing and promotional messages based on viewing limit controls.

Referring now to flowchart 500 in FIG. 5, one embodiment of a method for providing marketing messages and incentive awards to users will be described. As in previous embodiments, a user requests a program via the viewing limit control system (block 502), and the System validates the user (decision block 504). If the user is invalid, the System will send a message as such (block 506), otherwise, the System will check the viewing limit of the user (decision block 508). If the viewing limit is at a certain level, the System will provide a marketing message or incentive award (block 512), otherwise, the System will provide the requested program to the user (block 510).

Other embodiments of a systems for providing marketing messages and incentive awards is set forth in U.S. Provisional Patent Application No. 60/391,723, filed on Jun. 25, 2002, and entitled "Video Advertising," the entirety of which is incorporated by reference herein for all purposes.

In one embodiment, the number of viewings of a video program available in one delivery method is tied to the number of viewing available in another delivery method. For example, the number of SVOD viewings allowed could be determined from the number of times the video program is shown in the linear schedule. The number of viewings could be determined across delivery methods in some embodiments. For example, the user could be allowed 5 viewings of a program performed VOD or NVOD. Each listing of the program in the interactive program guide could indicate the number of viewings that remained. Also, the user could be warned in a message when getting low on viewing credits.

In a given time period, there is a predetermined number of views available for one or more programs. One embodiment allows rolling all or a fraction of the unused views to the next viewing period. For example, if twenty views were available in a month and only ten were used, the next month would have thirty views available. Some embodiments could roll over the views for a number of periods, but then expire the rolled views. For example, the views can only roll over for up to 6 months before they expire. In another embodiment, the number of views that can roll to the next period are capped at some ceiling. For example, up to one hundred views can roll over, but no more than that.

In another embodiment, once a program is viewing limited for a first delivery method, another program of a second delivery method could be substituted in the interactive program guide. In one example, a particular program in the linear schedule could be viewing limited after the specified number of views is exceeded or parental control is activated. A VOD program could be inserted into the linear schedule to fill that spot. From the perspective of the user, the program guide would appear complete in this embodiment. The replacement program could be chosen based upon time length, similarity in genre and/or other factors. In another example, a NVOD program could be inserted into the program guide listing to replace a linearly scheduled program that is viewing limited. If the user is not authorized to view the replacement program, an upsell message could be used to encourage purchase of the program or a package of programming that included the new program. A list of programs similar to the one that couldn't be viewed could be presented to the user in other embodiments. If a substitution is not made, the program guide could indicate the limits are reached by shading or coloring that entry differently or could just remove that entry from the program guide altogether.

In some embodiments, many delivery devices may be available for a particular account to view the video programs. Viewing limits could be imposed across these devices or uniquely for each device. For example, an account with four televisions and a computer could watch a particular program four times on any of these five devices. In another example, an account might have a PDA, a wireless phone and a television where a program could be viewed no more than five times on the wireless phone, once on the PDA and twice on the television.

Some embodiments may allow the viewing limits to be transportable to any viewing device. The user could log into any device capable of receiving and playing a program to access the viewing credits available on the user's account. For example, the user could log into a friend's computer across town and view a video program and that viewing would be deducted from the user's account. In another example, a television in a hotel room could be linked to the user's account to make available the content available for viewing. So long as the viewing device could receive the menus and content while being linked to the user's account, the user could use the viewing device interchangeably with those located the user's house.

One embodiment ties the viewing limits to the number of viewers enjoying the program. The set top box could use a video camera, for example, to determine the number of viewers for a particular program. A viewing limit could only allow a particular number of persons to view a program. This viewing limit could allow one person to view it the specified number of times, five people to view at one time, or any other permutation to achieve five person-views. For example, a limit could be set for ten person-views such that a first time nine people watch the program such that only a single person can view the program once more before additional views are prevented. In some embodiments, a certain number of viewers might be included in the viewing limit pricing scheme, but additional viewers would incur additional charges. For example, a professional boxing match might include one live view for five viewers, but additional viewers would pay an additional fee that is charged to the account holder. The additional person-views might be purchased in groups or individually.

Some embodiments could track views with a credit and debit point system. Each program could "cost" a fixed point amount or different selections could have different point values. For example, one program could cost four points, another one could cost a single point and yet another could cost a negative point (i.e., a one point credit). For example, commercials and infomercials that are viewed or played could result in the building-up of credit points that could be used to view other programs. Points could be purchased when needed or a subscription could be used to get a set number of points for a time period.

In some embodiments, the viewing limits could be demarked in credits, which have a time value. Specifically, each point could allow viewing of a given time period. For example, each quarter hour could be a point. A longer program would cost more points than a shorter program. Some embodiments could have different point values assigned to this time. For example, commercial-free television would cost two points for each half-hour and commercially sponsored television would cost one point for each hour.

Some embodiments could tie the parentally controlled view limits to the amount of time viewed. A given user could be limited in the time allowed to view for a given time period. For example, a child could view two hours a day or ten hours a week as specified by the parent. The time allowed could be flexible and based upon the content viewed. For example, educational shows could have unlimited viewing time allowed, cartoons could be limited to four hours a week and news limited to one hour a day, etc. for a particular viewer or group of viewers. The content-based limits could be based upon genre, content rating (e.g., MPAA rating), critical acclaim, type (e.g., sitcom, cartoon, movie, infomercial, commercial, commercial-free, etc.), time of day presented (e.g., morning, late night, prime-time, etc.), or any other characteristic.

Viewing limits, be them view-based or time-based, can be tied to location of the viewing device. In one location, the limits could be more than in another location. For example, more viewing may be allowed when at home, but less when away from home. The limits could be further refined by the type of device. For example, a portable media center may have ten views of a program at home, but only two views when away from home. When at school, the limits could be a single view or one half-hour. A GPS, cell phone location device or other location device could provide location information to the viewing device or location could be determined by the delivery network. The limits could be modified by content also. For example, G rated programs could be viewed outside the house, but no other programs.

Viewing limits, be them view-based or time-based, could be for a group of people associated with an account, but then could be more finely divided among the group. One administrator in the group would specify which members can enjoy the viewing limits in what amounts or under which circumstances. For example, the views may be evenly divided among all members of the group or the parent sub-group could get 10% and the children sub-group could get 90%. In another example, the parents get 50% and the children get the other 50% where each child shares equally in that 50%.

The various options discussed the preceding paragraphs could be offered to all subscribers of the service or a subset of the subscribers. In some cases, there would be no additional charges for these options, while some options might warrant an additional charge. For example, if the account holders could view content outside the house, there could be a transportability charge. The features can be bundled or a la carte in various deployments.

CONCLUSION

In conclusion, the present invention provides novel systems and methods for providing viewing limit controls on the delivery of content to end users. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A multi-channel video distribution system for controlling viewing of a video program by an end user, the multi-channel video distribution system comprising:
a program distribution system adapted to provide linearly-scheduled programs with predetermined rights to a plurality of end user viewing devices all limited by the predetermined rights, wherein the linearly-scheduled programs are distributed according to a linear schedule including multiple channels that simultaneously distribute the linearly-scheduled programs;
a viewing control system in communication with the program distribution system and the end user viewing devices, the viewing control system, comprising:
a parental control programming function;
a viewing limit configuration menu adapted to receive parental control rules from an end user, wherein:
the parental control rules define program viewing limits for a plurality of time periods, the plurality of time periods comprising a first time period and a second time period, wherein:
the first time period comprising a first scheduled start time and a first scheduled stop time; and
the second time period comprising a second scheduled start time and a second scheduled stop time; and
the parental control rules curtail the predetermined rights to create defined program viewing limits; and
a program viewing limit control system that:
counts a first number of viewings of a first program and a second number of viewings of a second program during the first time period, the first program having a first point value and the second program having a second point value;
determines whether a first time period spent budget based on the first number of viewings of the first program, the second number of viewings of the second program, the first point value, and the second point value exceeds a first time period viewing limit budget;
determines a roll over amount when the first time period viewing limit budget exceeds the first time period spent budget, the roll over amount being limited by a parental control rule;
prevents further viewings of the first program and the second program during the first time period if the first time period spent budget exceeds the first time period viewing limit budget and inserts a pre-selected program;
counts a third number of viewings of the first program and a fourth number of viewings of the second program during the second time period;
determines whether a second time period spent budget based on the third number of viewings of the first program, the fourth number of viewings of the second program, the first point value, and the second point value exceeds a second time period viewing limit budget; and
prevents further viewings of the first program and the second program during the second time period if the second time period spent budget exceeds the second time period viewing limit budget combined with the roll over amount and inserts a pre-selected program.

2. The multi-channel video distribution system for controlling viewing of the video program by the end user as recited in claim 1, wherein the parental control rules define program viewing limits based on one or more criteria selected from the group consisting of time period, program content, or a combination of time period and program content.

3. The multi-channel video distribution system for controlling viewing of the video program by the end user as recited in claim 2, wherein the program viewing limits can be set to zero for adult content.

4. The multi-channel video distribution system for controlling viewing of the video program by the end user as recited in claim 2, wherein the program viewing limits can be set high for educational content.

5. The multi-channel video distribution system for controlling viewing of the video program by the end user as recited in claim 2, wherein the program viewing limits can be set low for a time period after school.

6. The multi-channel video distribution system for controlling viewing of the video program by the end user as recited in claim 2, wherein the program viewing limits can be set low for a late night time period.

7. The multi-channel video distribution system for controlling viewing of the video program by the end user as recited in claim 1, wherein the parental control programming system is adapted to receive and implement defined parental control rules for a plurality of end users, and wherein the program viewing limit control system is adapted to apply the defined parental control rules to each of the plurality of end users.

8. The multi-channel video distribution system for controlling viewing of the video program by the end user as recited in claim 1, wherein the program distribution system comprises a system selected from the group including a cable programming transmission network, a satellite programming transmissions network, or an audio or video server connected to the Internet.

9. The multi-channel video distribution system for controlling viewing of the video program by the end user as recited in claim 1, wherein the viewing control system comprises a server located at a program service provider.

10. The multi-channel video distribution system for controlling viewing of the video program by the end user as recited in claim 1, wherein the viewing control system is configured with the program distribution system.

11. The multi-channel video distribution system for controlling viewing of the video program by the end user as recited in claim 1, wherein the viewing control system comprises a computing device at an end user location in communication with a server located at a program service provider.

12. The multi-channel video distribution system for controlling viewing of the video program by the end user as recited in claim 11, wherein the computing device comprises a device selected from the group including a set-top box, a personal video recorder (PVR), a video server, a television having set-top box and/or PVR functionality built therein, a personal digital assistant (PDA), a portable media center, a portable viewing device, and a personal computing device.

13. The multi-channel video distribution system for controlling viewing of the video program by the end user as recited in claim 1, wherein the programs comprise programs selected from group including pay per view video on demand (VOD) programs, near VOD programs, subscription VOD, cable television programs, terrestrially broadcast programs, satellite television programs, and music programs.

14. The multi-channel video distribution system for controlling viewing of the video program by the end user as recited in claim 1, wherein the time period can be based on years, months, weeks, days, portions of days, or hours.

15. The multi-channel video distribution system for controlling viewing of the video program by the end user as recited in claim 14, wherein the portions of days comprise morning, afternoon, evening, night and prime time viewing period.

16. The multi-channel video distribution system for controlling viewing of the video program by the end user as recited in claim 1, wherein the one or more end user viewing devices comprises a device selected from the group including a television set, a set-top box, a personal video recorder (PVR), a computer, a personal digital assistant (PDA), a wireless phone, a portable media center, or any combination of these devices.

17. The multi-channel video distribution system for controlling viewing of the video program by the end user as recited in claim 1, wherein the viewing control system is adapted to:
count a number of viewings viewed using all of the one or more end user viewing devices; and
prevent further viewings for all of the one or more end user viewing devices if the number of viewing exceeds the viewing limit for the time period.

18. The multi-channel video distribution system for controlling viewing of the video program by the end user as recited in claim 1, wherein the viewing control system is adapted to:
count a number of viewings viewed by each of the one or more end user viewing devices separately; and
prevent further viewings for each of the one or more end user viewing devices separately if the number of viewings for the one or more viewing devices exceeds the viewing limit for the time period.

19. The multi-channel video distribution system for controlling viewing of the video program by the end user as recited in claim 1, wherein the program is delivered as part of a linear schedule of programs.

20. In a multi-channel video distribution system for delivering video program content to end users as part of a linear schedule of simultaneously available program, a method for controlling viewing of programs by an end user, the method comprising steps of:
receiving linearly-scheduled programs with predetermined rights, wherein the linearly-scheduled programs are distributed according to a linear schedule including multiple channels that simultaneously distribute the linearly-scheduled programs;
receiving parental control rules from an end user using a viewing limit configuration menu, wherein the parental control rules:
define program viewing limits for a plurality of time periods, wherein the plurality of time periods includes a first time period and a second time period, the first time period comprising a first scheduled start time and a first scheduled stop time; and
curtail the predetermined rights to create defined program viewing limits;
counting a first number of viewings of a program during the first time period and a second number of viewings of the program during the second time period;
determining whether the first number of viewings exceeds the defined program viewing limits for the first time period;
determining a roll over amount if the defined program viewing limit for the first time period exceeds the first number of viewings;
preventing further viewings of the program during the first time period if the first number of viewings exceeds the defined program viewing limits for the first time period and inserting a pre-selected program;
determining whether the second number of viewings exceeds the defined program viewing limit for the second time period; and
preventing further viewings of the program during the second time period if the second number of viewings exceeds the defined program viewing limit for the second time period combined with the roll over amount.

21. The method for controlling the viewing of programs by the end user as recited in claim 20, wherein the parental control rules define program viewing limits based on one or more criteria selected from the group consisting of time period, program content, or a combination of time period and program content.

22. The method for controlling the viewing of programs by the end user as recited in claim 21, wherein the program viewing limits can be set to zero for adult content.

23. The method for controlling the viewing of programs by the end user as recited in claim 21, wherein the program viewing limits can be set high for educational content.

24. The method for controlling the viewing of programs by the end user as recited in claim 21, wherein the program viewing limits can be set low for a time period after school.

25. The method for controlling the viewing of programs by the end user as recited in claim 21, wherein the program viewing limits can be set low for a late night time period.

26. The method for controlling the viewing of programs by the end user as recited in claim 20, wherein the step of receiving parental control rules comprises receiving defined parental control rules for each of a plurality of end users, and wherein the method further comprises applying the defined parental control rules to each of the plurality of end users.

27. The method for controlling the viewing of programs by the end user as recited in claim 20, wherein the programs comprise programs selected from group including pay per view video on demand (VOD) programs, near VOD programs, subscription VOD, cable television programs, satellite television programs, terrestrially broadcast programs, and music programs.

28. The method for controlling the viewing of programs by the end user as recited in claim 20, wherein the plurality of time periods can be based on years, months, weeks, days, portions of days, or hours.

29. The method for controlling the viewing of programs by the end user as recited in claim 28, wherein the portions of days comprise morning, afternoon, evening, night and prime time viewing period.

30. The method for controlling the viewing of programs by the end user as recited in claim 20, wherein the one or more end user viewing devices comprises a device selected from the group including a television set, a set-top box, a personal video recorder (PVR), a computer, a PDA, a cellular phone, or any combination of these devices.

31. The method for controlling the viewing of programs by the end user as recited in claim 20, wherein the step of counting the first number of viewings comprises counting a total number of viewings viewed using all of the one or more end user viewing devices, and wherein the step of preventing further viewings of the program during the first time period comprises preventing further viewings for all of the one or more end user viewing devices if the total number of viewings exceeds the defined viewing limit for the first time period.

32. The method for controlling the viewing of programs by the end user as recited in claim 20, wherein the step of counting the first number of viewings comprises counting a separate number of viewings viewed by each of the one or more viewing devices separately, and wherein the step of preventing further viewings of the program during the first time period comprises preventing further viewings for each of the one or more viewing devices separately if the separate number of viewings for the one or more viewing devices exceeds the defined viewing limit for the first time period.

33. A video distribution system for controlling viewing of a video program by an end user, where the video program is distributed as part of a schedule of programs, the multi-channel video distribution system comprising:
- means for distributing linearly-scheduled programs with predetermined rights to one or more end user viewing devices all limited by the predetermined rights;
- means for receiving parental control rules from an end user, wherein the parental control rules define program viewing limits for a plurality of time periods that curtail the predetermined rights to create defined program viewing limits and the plurality of time periods includes a first time period and a second time period;
- a counter for counting a first number of viewings of a program during the first time period and a second number of viewings of the program during the second time period;
- means for determining whether the first number of viewings exceeds the defined program viewing limit for the first time period;
- means for determining a roll over amount if the defined program viewing limit for the first time period exceeds the first number of viewings;
- means for preventing further viewings of the program during the first time period if the first number of viewings exceeds the defined program viewing limit for the first time period;
- means for determining whether the second number of viewings exceeds the defined program viewing limit for the second time period; and
- means for preventing further viewings of the program during the second time period if the second number of viewing exceeds the defined program viewing limit for the second time period combined with the roll over amount.

34. The video distribution system for controlling viewing of the video program by the end user, where the video program is distributed as part of the schedule of programs as recited in claim 33, further comprising an advertising screen presented if the number of viewings exceeds the defined program viewing limit for the one or more time periods.

35. The video distribution system for controlling viewing of the video program by the end user, where the video program is distributed as part of the schedule of programs as recited in claim 33, wherein the program is removed from listings an interactive program guide when the program reaches the defined viewing limit.

* * * * *